US008832720B2

(12) United States Patent
Paves et al.

(10) Patent No.: US 8,832,720 B2
(45) Date of Patent: Sep. 9, 2014

(54) MULTIMEDIA DRIVER ARCHITECTURE FOR REUSABILITY ACROSS OPERATING SYSTEMS AND HARDWARE PLATFORMS

(75) Inventors: Jaques Paves, Sunnyvale, CA (US); Mukundakumar Rajukumar, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 29 days.

(21) Appl. No.: 13/602,468

(22) Filed: Sep. 4, 2012

(65) Prior Publication Data

US 2013/0179907 A1 Jul. 11, 2013

Related U.S. Application Data

(60) Provisional application No. 61/583,387, filed on Jan. 5, 2012.

(51) Int. Cl.
*G06F 9/54* (2006.01)
(52) U.S. Cl.
USPC ............................................ 719/322; 719/321
(58) Field of Classification Search
CPC ..................................................... G06F 13/102
USPC ........................................... 719/321, 322, 323
See application file for complete search history.

(56) References Cited

U.S. PATENT DOCUMENTS

| 5,265,252 | A  | * | 11/1993 | Rawson et al. | ............... 719/326 |
| 6,862,735 | B1 | * | 3/2005  | Slaughter et al. | ............. 719/315 |
| 7,233,999 | B2 |   | 6/2007  | Hadi | |
| 7,664,931 | B2 |   | 2/2010  | Erforth | |
| 2009/0094325 | A1 | | 4/2009 | Karia | |
| 2010/0169898 | A1 | * | 7/2010 | Quarre et al. | ................. 719/323 |

OTHER PUBLICATIONS

Altera Corp., "Nios II Software Developer's Handbook" (May 2011), Chapter 6, pp. 1-46 [retrieved from www.altera.com/literature/hb/nios2/n2sw_nii52004.pdf].*
Tanenbaum, A., "Modern Operating Systems" (2001), $2^{nd}$ Edition, pp. 778-780.*
Schoeberl, M.; Korsholm, S.; Kalibera, T.; & Ravn, A. P., "A Hardware Abstraction Layer in Java" (Nov. 2011), ACM Transactions on Embedded Computing Systems, vol. 10, No. 4, Article 42, pp. 1-39 [retrieved from http://dl.acm.org/citation.cfm?id=2043666].*

* cited by examiner

*Primary Examiner* — Brian W Wathen
(74) *Attorney, Agent, or Firm* — Trop, Pruner & Hu, P.C.

(57) ABSTRACT

A multimedia driver architecture allows significant portions of the driver components to be shared across operating systems and hardware platforms.

6 Claims, 3 Drawing Sheets

MULTIMEDIA DRIVER ARCHITECTURE FOR REUSABILITY ACROSS OPERATING SYSTEMS AND HARDWARE PLATFORMS

CROSS REFERENCE TO RELATED APPLICATION

This application is a non-provisional application claiming priority to provisional application Ser. No. 61/583,387 filed Jan. 5, 2012 hereby expressly incorporated by reference herein.

BACKGROUND

Implementations generally may relate to the field of media drivers.

Multimedia device driver interface (DDI) layers typically expose a set of rendering models and feature sets, such as decoding and video processing, providing different levels of functionality for a wide range of video playback and transcoding applications.

The multimedia driver stack is implemented as two main components, a DDI or Device Driver Interface Layer and a HAL or Hardware Abstraction Layer. The DDI layer implements driver interfaces and protocols as defined by Microsoft Corporation and may contain some of the high level rendering logic.

The HAL implements low level rendering logic. It is responsible for setting up hardware states, generating and submitting command buffers for execution in the graphics processing unit (GPU), building and loading media firmware in the GPU and implementing the interlaces between driver and media firmware.

BRIEF DESCRIPTION OF THE DRAWINGS

Some embodiments are described with respect to the following figures.

DETAILED DESCRIPTION

Figure 1:
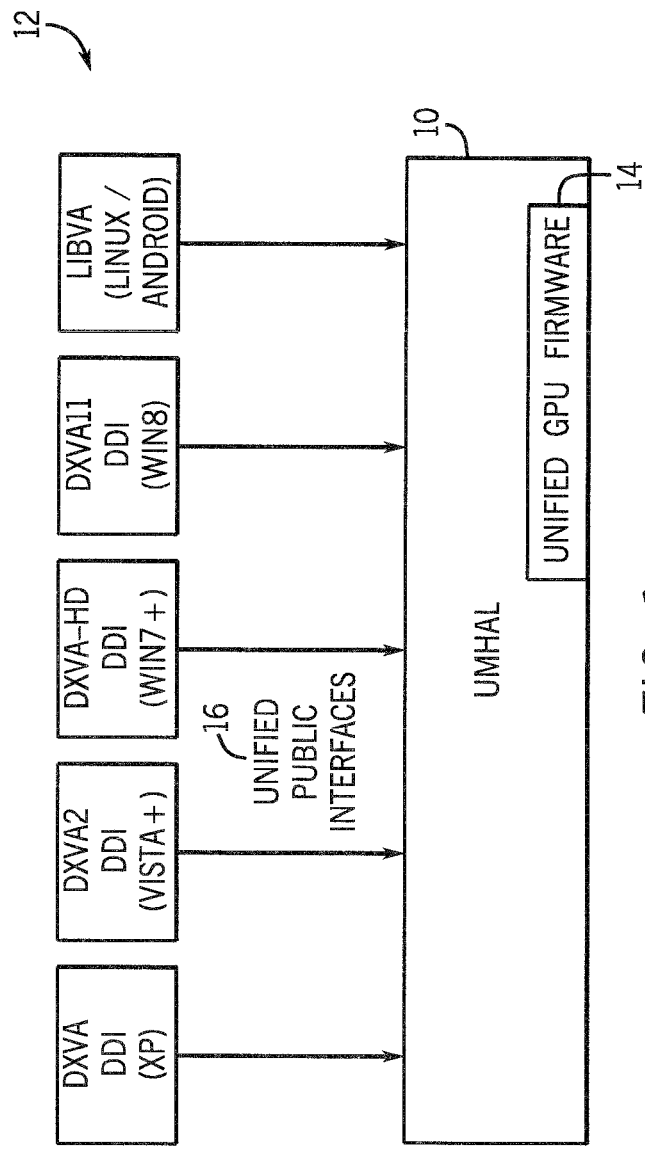
FIG. 1 is a depiction of the media driver stack according to one embodiment.

Under Windows operating systems (OSs), the media rendering models are extensively covered by Microsoft DDI specifications. See DirectX Video Acceleration (DXVA DDI) http://msdn.microsoft*com/en-us/library/ff553861 (v=VS.85).aspx, Video Processing for DirectX VA 2.0 (DXVA2 DDI), http://msdn.microsoft*com/en-us/library/ff570545(v=VS.85).aspx, Processing High-Definition Video (DXVA-HD DDI) http://msdn.microsoft*com/en-us/library/ff569190(v=VS.85).aspx. (with asterisks replacing periods to avoid inadvertent linking). Each DDI interface is tightly coupled with a set of DirectX Application Program interfaces (APIs).

in other operating systems, a similar set of interfaces are used to expose a similar number of media capabilities. For instance, LibVA is a commonly used API used for that purpose in Linux/Android space. For the Macintosh Operating System, Apple defines its own sets of APIs for video decoding and processing.

in addition to supporting a large set of DDI interfaces, the media driver stack has also evolved to support different graphics generations, as well as new features such as Advanced Video Coding (AVC) decode and encode, de-noise and image enhancement filters, and film mode detection, to name a few.

The original media driver stack had to evolve very quickly in face of new DDIs and hardware platforms, and suffered from carrying legacy interfaces into new designs. As a consequence, maintaining the driver stack was complicated by redundancies and lack of a uniform structure between multiple layers of the driver stack.

A video driver architecture, according to some embodiments, allows significant portions of the driver components to be shared across operating systems and hardware platforms. This rendering architecture fits the rendering models of at least the following operating systems: Windows XP®, Windows 7®, Windows 8®, Linux, Android, and Macintosh operating system, in some embodiments.

There are four key parts to the video driver architecture, including an operating system (OS) interface, a hardware (HW) interface, a renderer module and a public interface. Reuse across OSs is achieved by abstracting operating system specific structures, callbacks, and services in an OS interface layer. The driver is modularized in a way that the rendering code is detached from the operating system rendering model and its underlying objects and functions. All calls from the driver to abstracted OS services are executed through the OS interface layer.

Re-use of rendering components across hardware platforms is achieved by means of a hardware abstraction interface. The hardware abstraction interface abstracts the use of hardware states (samplers, surfaces) and commands.

The rendering pipeline is implemented to support a superset of all video rendering functions and interfaces required for the target OSs. For example, the rendering function may support all requirements for Win7(D3D9 DirectX Video Acceleration (DxVA)), Win8 (D3D11 DxVA) and Linux LibVA. The rendering logic is modularized so that the majority of the rendering code is detached from the hardware architecture, allowing rendering code to be shared across hardware engines that share a similar architecture.

The entire driver stack is exposed to external components by means of a well defined. OS and hardware independent public interface. All rendering services provided are exposed by this common interface.

The media driver stack may be designed to deal with a quick evolution of DDI interfaces, operating systems and graphics platforms. It may also be designed to simplify the introduction and testing of new media features.

The Unified Media hardware abstraction layer (HAL), also called UMHAL 10, unifies and replaces all media rendering functionality as shown in FIG. 1. As used herein "unified" means that the same code works with Windows, Linux/Android and Macintosh based platforms. The UMHAL interfaces via unified public interfaces 16 with the DDI layers 12.

The benefits of maintaining a unified media HAL layer 10 are numerous in some embodiments, from the amount of code to maintain in both driver and graphics processing unit (GPU) firmware, to the validation and debugging efforts. Additionally, bug resolutions and implementation of new features are almost immediately available to all DDI layers 12 for use by applications. Other benefits include unified media rendering engines, unified graphics processing unit (GPU) firmware 14 and dynamic firmware building and loading architectures, support for all DDI interfaces 12 and OSs (XP, Vista, Win7, future) in Unified DDI-UM HAL interface 10.

One example of such flexibility is in enabling of stereoscopic-3D (S-3D) playback. Once the HAL support for S-3D is in place, it is immediately available on DXVA2, DXVA-HD and Windows 8 DDI interfaces.

The UMHAL development methodology emphasizes self-containment of components, and also enforces a strict set of dependencies to avoid breakdown of the structure as new features are incorporated or when evolving into new operating systems or platforms.

Figure 2:
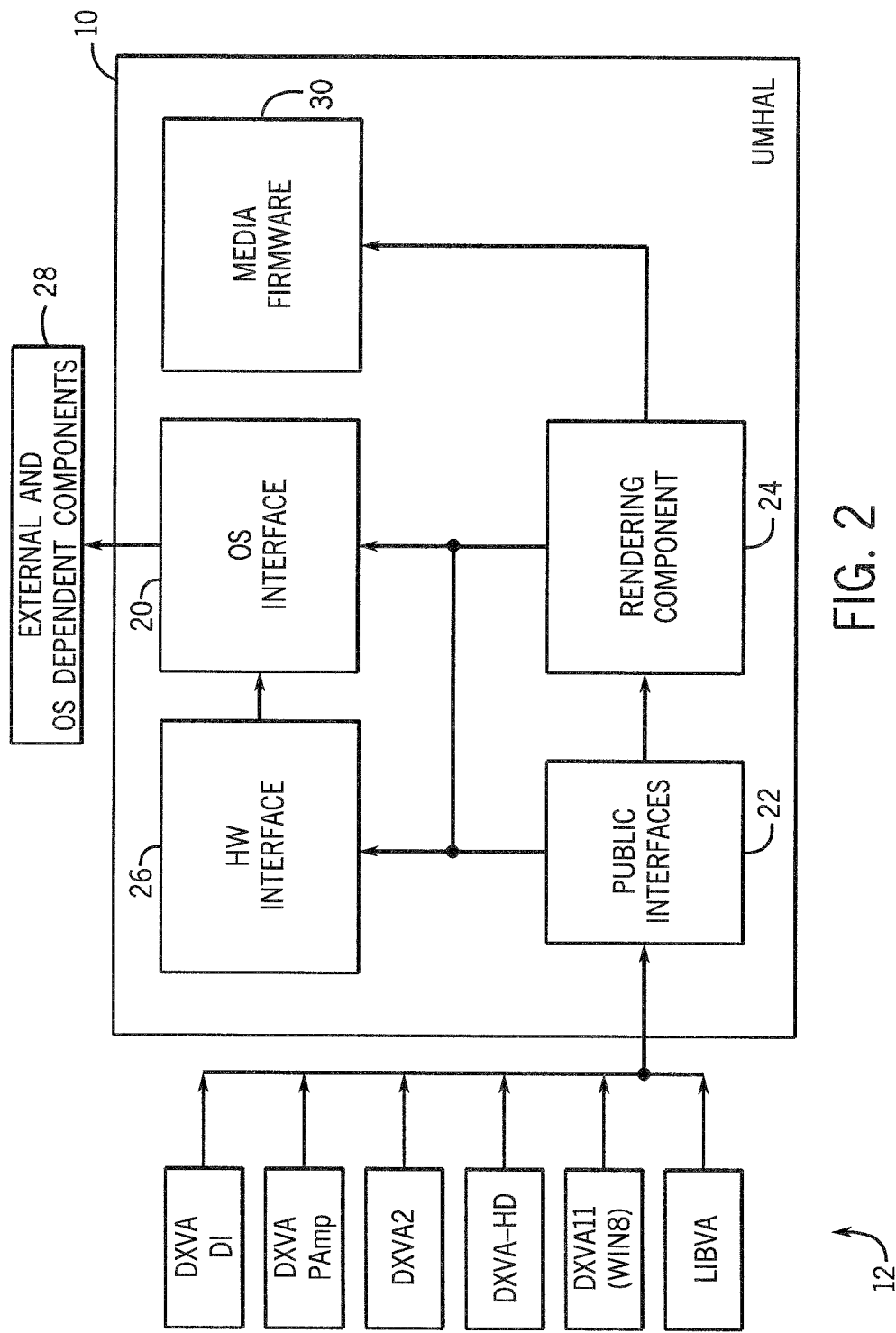
FIG. 2 is a high level block diagram according to one embodiment.

FIG. 2 shows the block diagram of the UMHAL and the dependencies that make up its structure. All interfaces between the UMHAL and external driver components are channeled through the OS interface 20. The OS interface represents an abstraction of OS dependent functions, objects and structures, which allows HAL components to be practically OS unaware. The following are a few examples of the OS abstractions exposed by the OS interface component: creation, destruction, locking and unlocking of resources (buffers), submission of command buffers to the graphics processing unit (GPU), file access.

The interface between all media DDIs and the UMHAL happens exclusively through a set of public interfaces 22. The public interfaces expose only the necessary functions to the DDI layer 12, such as instantiation and destruction of UMHAL and rendering functions.

The public interfaces define the single point of contact between DDI layers and UMHAL 10, providing interfaces for creation, destruction, rendering, query, etc. The DDI should never access internal UMHAL components or structures. UMHAL 10 provides utility functions that may be used by all DDI layers to simplify DDI-UMHAL integration—avoiding code duplication.

The most important interfaces exposed by UMHAL are in the rendering component 24 referred to as the DDI-HAL interface. This rendering component may support a super set of rendering models for DDI interfaces.

The rendering component is responsible for the rendering logic through setting up hardware states, building/loading media firmware in the GPU, generating and submitting command buffers. The rendering component may be the only UMHAL component aware of media firmware architecture and rendering logic. Low level rendering engines are responsible for advanced processing, compositing, and other video processing features in some embodiments. Multiple rendering engines may coexist to deal with different rendering or kernel architectures.

The hardware interface component 26 serves exclusively as a hardware state manager, and also provides basic functionality for submission of command buffers and associated states.

Depending on the complexity of the media feature, the rendering component may be organized as a top level rendering component and a set of low level rendering engines or sub-renderers.

The main function of the hardware interface component 26 is to provide abstractions to hardware dependent functions. As one of its functions, it is responsible for management of hardware states (state heaps, media states, buffers), and for dealing with hardware specific implementations of generic hardware setup functions.

All rendering components rely on the hardware interface component to allocate and setup hardware states, and for flushing states and batch buffers for execution in GPU.

The hardware interface component is responsible for management of hardware states (state heaps, media states, buffers), and for dealing with hardware specific implementations (surface states, sampler states). All rendering components use the hardware Interfaces to allocate and setup hardware states, and for submitting states and batch buffers. The hardware Interface relies on the OS Interface to manage OS resources (buffers, surfaces), and for submitting command buffers.

The hardware interface component provides a set of interfaces to manage hardware states, provides access to hardware definitions, such as states and commands and hides low level implementation details from the rendering layer: Global State Heap (GSH)/Surface State Heap (SSH) structures, media firmware loading, unloading, caching and GSH (graphics memory), submission of batch buffers (OS/hardware dependent that contain hardware commands that can be reused across multiple frames as is), media firmware loading, unloading, caching in GSH (graphics memory), submission of batch buffers (OS/hardware dependent that contain hardware commands that can be reused across multiple frames as-is) and allocation of hardware resources, as well as synchronization. These heaps sit in graphics memory and contain various hardware states including characterization of surfaces, and media firmware needed by the graphics processing unit for processing of the current frame. The hardware interface is not a hardware abstraction layer. The component simply provides a unified mechanism to program hardware states. The hardware interface also provides access to hardware command definitions.

UMHAL supports a set of creation parameters that control resource allocation and feature enabling. This allows UMHAL to be customized to run in different environments. For instance, in a resource constrained environment (Android/Embedded), some of the advanced features may be completely disabled, reducing memory footprint and performance overhead.

As previously mentioned, the OS interface layer 20 defines a single point of contact between all internal UMHAL components and OS dependent resources and functions. The OS Interface has no access to other UMHAL components in some embodiments, as its sole function is to provide services by abstracting OS related functions. OS interface is the only module aware of external and OS dependent components.

The OS interface is the only module aware of external driver and OS dependent components and functions. Apart from the OS interface, the rest of the UMHAL code may remain OS independent.

The rendering component 24 is responsible for the actual rendering logic. It is responsible for setting up hardware states, building and loading media firmware 30 in GPU, generating and submitting command buffers that will ultimately be executed by the GPU.

External and OS dependent components 28 are responsible for building media firmware on demand for different renderers. They may support dynamic building models for all platforms. They include caching architecture to avoid rebuilding firmware for common and repeating media operations. They may be extended to support firmware dynamic building for renderers performing advanced processing such as deinterlacing and denoise.

Figure 3:
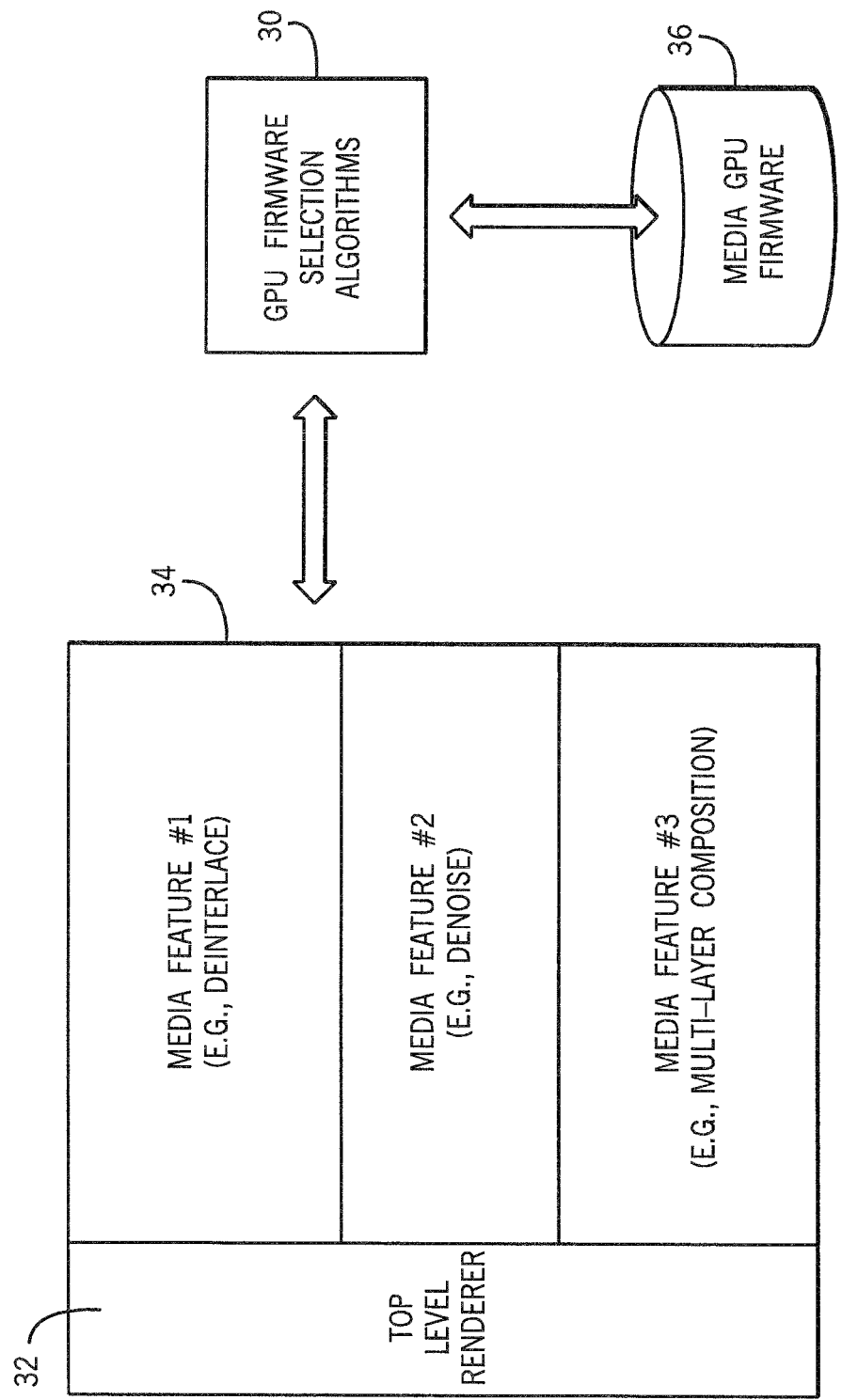
FIG. 3 is a diagram showing the renderer and media firmware dynamic building and loading block diagrams for one embodiment.

In case of video decoding, sub-renderers could be descending and in-loop deblocking (ILDB) blocks. ILDB is a type of post-processing operation to mitigate artifacts from block encoding. In case of video processing sub-renderers are advanced processing (denoise, deinterlace) and video compositing blocks. This organization is shown in FIG. 3.

The "Top Level Renderer" 32 is responsible for coordinating the sequence of calls to low level renderers 34 in order to implement a complex media pipeline. As new renderers are added, the top level renderer is also extended to support more complex filters and functions. The low level renderers may, for example include frame rate conversion, image stabilization, chroma de-noise, video compositing, compositing phase renderer, and advanced processing.

In this architecture, each sub-renderer is completely self-contained and independent, and has full access to OS and hardware interfaces for rendering purposes. This allows sub-renderers 34 to be easily replaced or removed without significant impact to the overall rendering logic, thereby enabling easy customizations for different hardware platforms and form factors.

The top rendering component can be called through one of the public interfaces, implementing a superset of all rendering functionality required by all media DDI interfaces.

GPU firmware selection algorithms 30 are responsible for building media GPU firmware 36 on demand for different rendererers including Deinterlacing. Denoise and Compositing. It may support dynamic linking models for all platforms and may include caching architecture to avoid rebuilding firmware for common mediaoperations.

UMHAL represents a significant step towards new and more advanced media processing features. It defines a common framework that can be easily extended to accommodate new rendering logic, new operating systems and new hardware interfaces. By allowing significant code sharing across operating systems, it significantly reduces time to market for advanced media features, and in a wide range of application.

A UMHAL architecture may eliminate redundancies existing in multiple media driver implementations, simplify introduction of new media features, platforms. OS, rendering models, allow sharing DDIs of new feature sets, bug fixes, optimizations, improve software architecture and development methodology, and enable better utilization of resources: less code to maintain and test, more team members with full understanding of UMHAL architecture, software stack, debugging methodologies.

The following clauses and/or examples pertain to further embodiments:

One example embodiment may be a method supplying a multimedia driver stack with a unified media hardware acceleration layer and unified multimedia firmware; and providing a plurality of different device driver interface layers for use by said multimedia driver stack. The method may also include enabling said driver stacks to operate with Windows, Macintosh, Linux and Android operating systems. The method may also include abstracting operating system specific structures, callback and services. The method may also include processing said hardware acceleration layer that operates with Windows and Macintosh device driver interfaces. The method may also include providing a single hardware acceleration layer that also works with Android and Linux device driver interfaces. The method may also include providing a single point of contact between all hardware acceleration layer components and operating system dependent resources.

Another example embodiment may be a non-transitory computer readable media storing instructions executed by a processor to perform the method including executing a multimedia driver stack with a unified media hardware acceleration layer in unified multimedia firmware, and making a plurality of different device driver interface layers available for use by said multimedia driver stack. The media may also store instructions to enable said unified media hardware acceleration layer to operate with Windows, Macintosh, Linux and Android operating systems. The media may store instructions to abstract operating systems specific structures, callbacks and services. The media may also store instructions providing a hardware acceleration layer that operates with Windows and Macintosh device driver interfaces. The media may also store instructions to provide a single hardware acceleration layer that also works with Android and Linux device driver interfaces. The media may also store instructions to create a single point of contact between all acceleration layer components and operating system dependent resources.

Another example embodiment may be an apparatus comprising a graphics processor to supply a multimedia driver stack with unified media hardware acceleration layer and unified multimedia firmware, and the processor to provide a plurality of different device driver interface layers for use by said multimedia driver stack, and a storage coupled to said processor. The apparatus may enable said unified media hardware acceleration layer to operate with Windows, Macintosh, Linux and Android operating systems. The apparatus may comprise a processor to abstract operating systems specific structures, callbacks and services. The apparatus may comprise a processor to provide a hardware acceleration layer that operates with Windows and Macintosh device driver interfaces. The apparatus may comprise a processor to provide a single hardware acceleration layer that also works with Android and Linux device driver interfaces. The apparatus may comprise a processor to provide a single point of contact between all acceleration layer components and operating system dependent resources.

In another example embodiment one or more non-transitory computer readable media storing instructions executed by a processor to enable a multimedia driver stack to operate with Windows, Macintosh, Linux and Android operating systems. The media may further store instructions to abstract operating systems specific structures, callbacks and services. The media may further store instructions providing a hardware acceleration layer that operates with Windows and Macintosh device driver interfaces. The media may further store instructions to create a single point of contact between all acceleration layer components and operating system dependent resources.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   supplying a multimedia driver stack with a media hardware abstraction layer and multimedia firmware;
   providing a plurality of different device driver interface layers for use by said multimedia driver stack; and
   enabling said driver stack to operate with more than one different operating system by abstracting operating system specific structures, callback and services.

2. The method of claim 1 including providing a single point of contact between all hardware abstraction layer components and operating system dependent resources.

3. One or more non-transitory computer readable media storing instructions executed by a processor to perform the method including:
- executing a multimedia driver stack with a media hardware abstraction layer and multimedia firmware;
- making a plurality of different device driver interface layers available for use by said multimedia driver stack; and
- enabling said driver stack to operate with more than one different operating system by abstracting operating system specific structures, callback and services.

4. The media of claim 3 further storing instructions to create a single point of contact between all abstraction layer components and operating system dependent resources.

5. An apparatus comprising:
- a graphics processor configured to supply a multimedia driver stack with media hardware abstraction layer and multimedia firmware, the processor configured to provide a plurality of different device driver interface layers for use by said multimedia driver stack, and enable said driver stack to operate with more than one different operating system by abstracting operating system specific structures, callback and services; and
- a storage coupled to said processor.

6. The apparatus of claim 5 comprising a processor to provide a single point of contact between all abstraction layer components and operating system dependent resources.

* * * * *